United States Patent
Nakamoto

(10) Patent No.: US 10,298,719 B2
(45) Date of Patent: May 21, 2019

(54) NETWORK SYSTEM, AND CONTROL METHOD FOR NETWORK SYSTEM

(71) Applicant: CANON KABUSHIKI KAISHA, Tokyo (JP)

(72) Inventor: Hisashi Nakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 14/984,924

(22) Filed: Dec. 30, 2015

(65) Prior Publication Data

US 2016/0197793 A1 Jul. 7, 2016

(30) Foreign Application Priority Data

Jan. 6, 2015 (JP) ................. 2015-000621

(51) Int. Cl.
| | | |
|---|---|---|
| *G06F 15/173* | (2006.01) | |
| *H04L 29/08* | (2006.01) | |
| *H04L 12/751* | (2013.01) | |
| *H04L 12/24* | (2006.01) | |

(52) U.S. Cl.
CPC ............ *H04L 67/34* (2013.01); *H04L 41/082* (2013.01); *H04L 41/5003* (2013.01); *H04L 45/026* (2013.01)

(58) Field of Classification Search
CPC ....... H04L 67/34; H04L 41/82; H04L 45/026; H04L 41/5003
USPC .................................................. 709/223, 224
See application file for complete search history.

(56) References Cited

U.S. PATENT DOCUMENTS

| | | | | |
|---|---|---|---|---|
| 4,894,798 A | * | 1/1990 | Doyle | .................. G06F 17/214 400/279 |
| 6,862,619 B1 | * | 3/2005 | Sugauchi | .............. H04L 41/046 709/224 |
| 2004/0010627 A1 | * | 1/2004 | Ellis | ........................ H04L 43/50 709/250 |
| 2004/0145766 A1 | * | 7/2004 | Sugishita | .................. G06F 8/65 358/1.13 |
| 2008/0189693 A1 | * | 8/2008 | Pathak | ...................... G06F 8/65 717/168 |

(Continued)

FOREIGN PATENT DOCUMENTS

| | | |
|---|---|---|
| CN | 103139321 A | 6/2013 |
| CN | 103198248 A | 7/2013 |
| JP | 2010-086370 A | 4/2010 |

*Primary Examiner* — David R Lazaro
*Assistant Examiner* — Mariegeorges A Henry
(74) *Attorney, Agent, or Firm* — Canon U.S.A., Inc. IP Division

(57) ABSTRACT

If it is determined that a delivery permission flag of a network device being a delivery target of a software program is inactivated (OFF), a delivery server instructs a set-value management server to activate (ON) the delivery permission flag of the network device being the delivery target. The set-value management server activates the delivery permission flag of the network device in response to the instruction and notifies the completion to the delivery server. The delivery server performs delivery preparation for the software program in response to the notification of the completion and, after the delivery preparation, controls the delivery of the software program in response to a request from a network device with the delivery permission flag activated.

9 Claims, 15 Drawing Sheets

(56) References Cited

U.S. PATENT DOCUMENTS

| | | | |
|---|---|---|---|
| 2011/0277008 A1* | 11/2011 | Smith | H04N 21/2385 |
| | | | 725/116 |
| 2014/0041009 A1* | 2/2014 | Kousaka | H04L 63/0492 |
| | | | 726/9 |
| 2015/0207666 A1* | 7/2015 | Basso | G06F 17/30345 |
| | | | 709/223 |

* cited by examiner

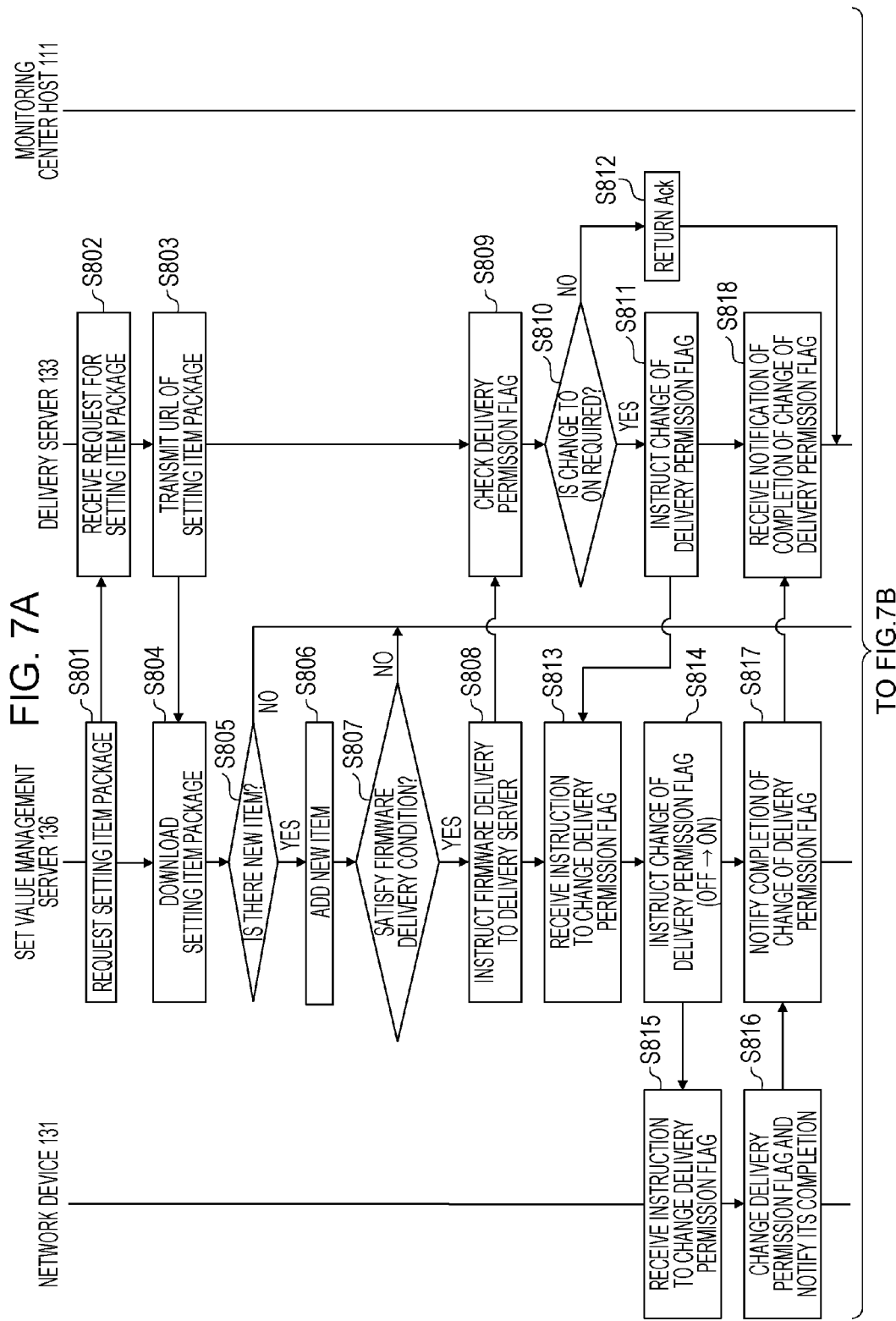

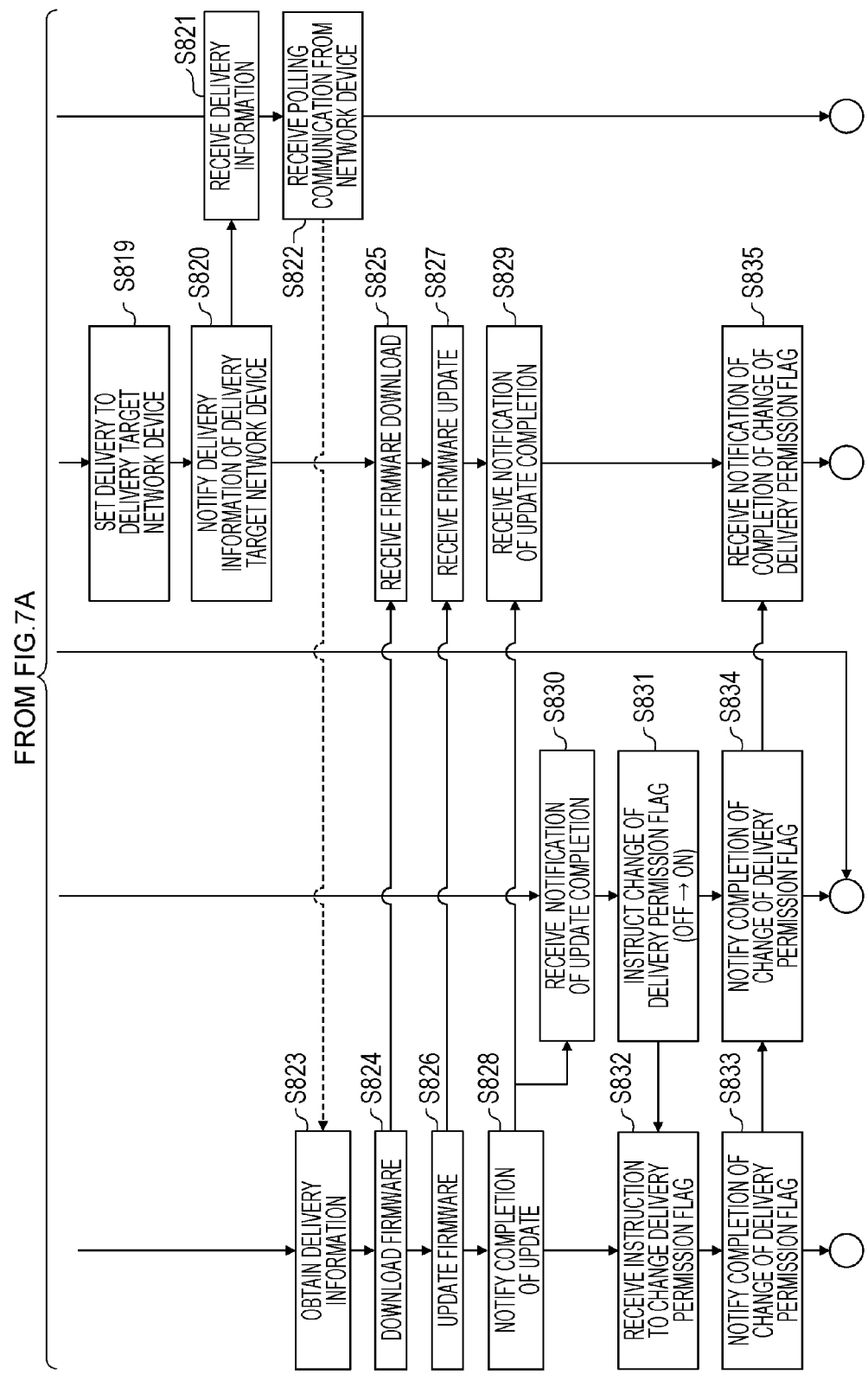

FIG. 8

```
{"date":[         ~~~~ 901
{"serial":AAA0001, ~~~~ 902
"main-con":"80.01"}, ~~~~ 903

{"serial":ZZZ0001,
"main-con":"35.01"},
}

| RANGE OF NETWORK DEVICE SERIAL NUMBERS | MAIN CONTROLLER VERSION | NAME OF SETTING ITEM PACKAGE | URL OF SETTING ITEM PACKAGE |
|---|---|---|---|
| AAA00001 – AAA99999 | 71.01 | sss001.bat | http://xxx/yyy/sss001.bat |
| AAA00001 – AAA99999 | 75.01 | sss002.bat | http://xxx/yyy/sss002.bat |
| AAA00001 – AAA99999 | 80.01 | sss003.bat | http://xxx/yyy/sss003.bat |
| ZZZ00001 – ZZZ99999 | 30.01 | sss004.bat | http://xxx/yyy/sss004.bat |
| ZZZ00001 – ZZZ99999 | 33.01 | sss005.bat | http://xxx/yyy/sss005.bat |
| ZZZ00001 – ZZZ99999 | 34.01 | sss006.bat | http://xxx/yyy/sss006.bat |
| ZZZ00001 – ZZZ99999 | 35.01 | sss007.bat | http://xxx/yyy/sss007.bat |
| ⋮ | ⋮ | ⋮ | ⋮ |

FIG. 10

NAME OF SETTING ITEM PACKAGE: sss003.bat
RANGE OF NETWORK DEVICE SERIAL NUMBERS: AAA00001 – AAA99999
MAIN CONTROLLER VERSION: 80.01

| SET VALUE KEY | DEFAULT VALUE | EMERGENCY LEVEL | CATEGORY | CUSTOMER INFORMATION |
|---|---|---|---|---|
| XxxAA_001 | ON | B | SECURITY | COMMON |
| XxxAB_001 | 1 | C | BUG CORRECTION | XX INDUSTRY |
| XxxYY_001 | TRAY C | C | USABILITY | COMMON |
| XxxBB_001 | ON | A | BUG CORRECTION | YY TRADING FIRM |
| XxxAD_001 | ON | A | SECURITY | ZZ BANK |
| XxxAA_001 | OFF | C | FLAG | COMMON |
| XxxUX_001 | OFF | C | FLAG | COMMON |
| ⋮ | ⋮ | ⋮ | ⋮ | ⋮ |

FIG. 11

| SETTING ITEM | SET VALUE KEY | DEFAULT VALUE | EMERGENCY LEVEL | CATEGORY | CUSTOMER INFORMATION | TARGET NETWORK DEVICE |
|---|---|---|---|---|---|---|
| | 1203 | 1204 | 1205 | 1206 | 1207 | 1208 |
| USE AUTHENTICATION | XxxAA_001 | ON | B | SECURITY | COMMON | COMMON |
| SET PRINTING DENSITY | XxxAB_001 | 1 | C | BUG CORRECTION | XX INDUSTRY | BBB00001-BBB99999 |
| PRIORITY DISCHARGE TRAY | XxxYY_001 | TRAY C | C | USABILITY | COMMON | COMMON |
| COLOR MAP CONTROL (SPLATTERING PREVENTION) | XxxBB_001 | ON | A | BUG CORRECTION | YY TRADING FIRM | AAA00001-AAA99999 |
| DELIVERY PERMISSION FLAG | XxxAA_001 | OFF | C | FLAG | COMMON | COMMON |
| LOCAL TOOL USAGE FLAG | XxxUX_001 | OFF | C | FLAG | COMMON | COMMON |
| .. | .. | .. | .. | .. | .. | .. |

1202 ↑ 1201

| TIGHTEN AUTHENTICATION (SHA1 FORBIDDEN) | XxxAD_001 | ON | A | SECURITY | ZZ BANK | ZZZ00001-ZZZ99999 |

| | FIRMWARE DELIVERY CONDITIONS (1302) | EXECUTION FLAG (1303) | CUSTOMER INFORMATION (1304) |
|---|---|---|---|
| 1305 | EMERGENCY LEVEL OF NEW SET ITEM IS A | ACTIVE | ZZ BANK |
| | EMERGENCY LEVEL OF NEW SET ITEM IS B | INACTIVE | ZZ BANK |
| 1306 | CATEGORY OF NEW SET ITEM IS SECURITY | ACTIVE | ZZ BANK |
| | CATEGORY OF NEW SET ITEM IS BUG CORRECTION | INACTIVE | ZZ BANK |
| | CATEGORY OF NEW SET ITEM IS USABILITY | INACTIVE | ZZ BANK |
| | CUSTOMER INFORMATION OF NEW SET ITEM IS DIFFERENT | INACTIVE | ZZ BANK |
| | ⋮ | ⋮ | ⋮ |

(Table: 1301)

FIG. 13

| NETWORK DEVICE SERIAL NUMBER (1402) |
|---|
| BBB00001 |
| CCC00001 |
| DDD00001 |
| EEE00001 |
| FFF00001 |

(Table: 1401)

FIG. 14

| NETWORK DEVICE SERIAL NUMBER | DELIVERY PERMISSION FLAG |
|---|---|
| AAA00001 | ON |
| BBB00001 | ON |
| CCC00001 | ON |
| DDD00001 | OFF |
| EEE00001 | OFF |
| FFF00001 | ON |
| ZZZ00001 | ON |
| ⋮ | ⋮ |

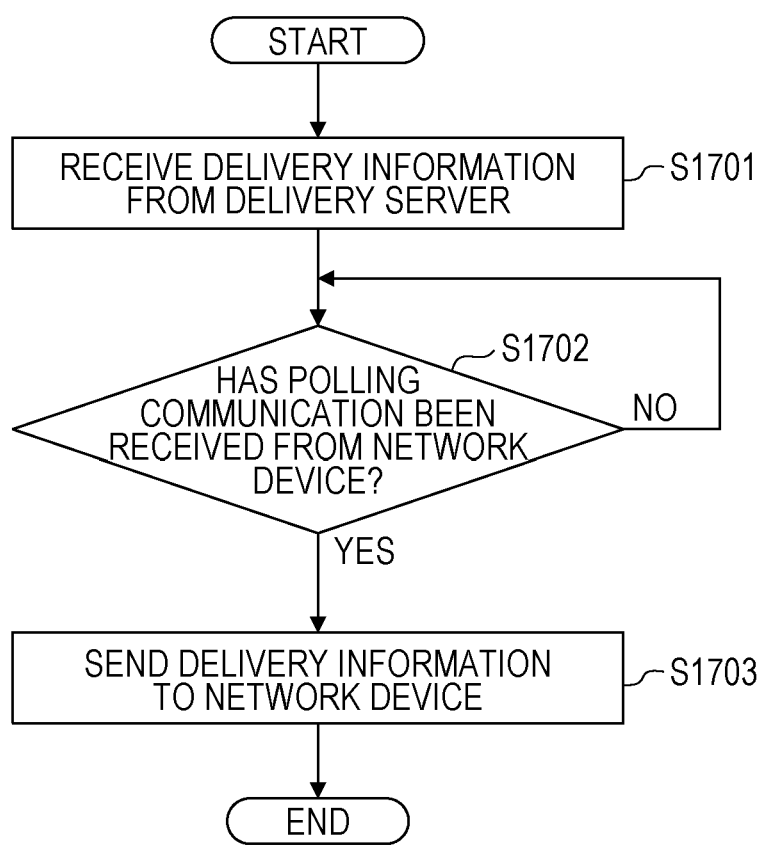

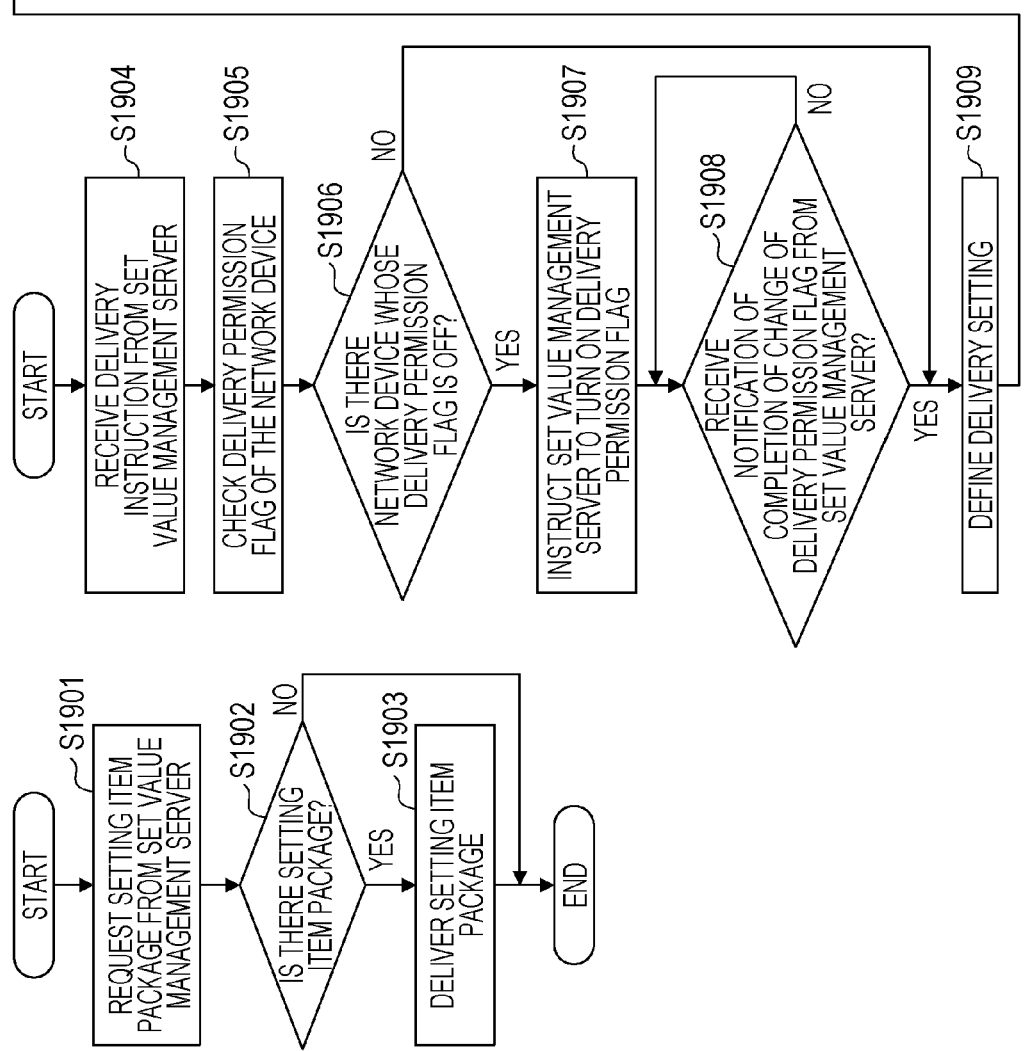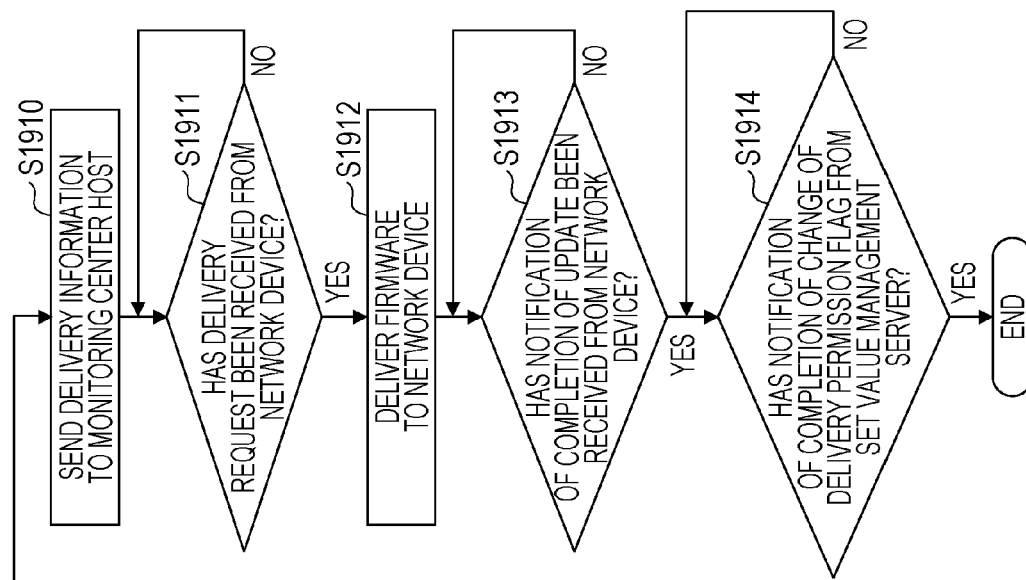

NETWORK SYSTEM, AND CONTROL METHOD FOR NETWORK SYSTEM

BACKGROUND OF THE INVENTION

Field of the Invention

The present invention relates to a technology for delivering a software program to a network device such as an image formation apparatus.

Description of the Related Art

Conventionally, software including a firmware program in an image formation apparatus has been updated when the update is required due to occurrence of a functional improvement or a failure therein. Such image formation apparatus here may be a printer or a copy machine. Hereinafter, an apparatus running over a network such as an image formation apparatus will be called a network device.

Software update may be performed by delivering an updated software program from a predetermined delivery server over the Internet or by using an update tool via a USB or over an intranet. In a case where a software update is performed in a network device through the delivery server as described above, a delivery target network device is designated through a Web screen of the delivery server, and a delivery date and time is set so that an updated software program is delivered over the Internet.

The delivery server delivers a software program to a network device by using the Internet. For fast software delivery, the delivery server is capable of transferring a software program to a storage connected to the Internet so that an external server can deliver the software program.

Conventionally, a set-value management server is available for managing set values for a network device. The set-value management server handles set values for a serviceman for a network device and set values for a user, and configuration information as management targets. A target network device may access the set-value management server so that those set values may be synchronized periodically or when a firmware program therein is updated. The set-value management server is further capable of editing settings for the device on the server. Data edited thereby are reflected to the device through the set value synchronization mechanism.

The delivery server holds as package data setting item information to be used in the set-value management server. The setting item package held in the delivery server has information regarding use of authentication, use of personalization, a priority discharge tray, and a printing density setting as setting item information for the network device. The set-value management server may access the delivery server periodically or as required to download the setting item package and update the setting items.

As a conventional technology relating to content delivery and set-value management in a network device, Japanese Patent Laid-Open No. 2010-86370 proposes a firmware update system capable of safely and securely taking over set values for a firmware program to a new firmware program.

More specifically, the firmware program update system includes a set value encryption unit configured to acquire set values which have been set in the current firmware program and encrypt a part of the set values, a set value transmission unit configured to transmit an encrypted set value and an unencrypted set value to the delivery server, a firmware program acquisition unit configured to acquire the new firmware program, in which the encrypted set value and the unencrypted set value have been set, from the delivery server, and a firmware program update unit configured to decrypt the encrypted set value and install the new firmware program.

As described above, the set-value management server acquires a setting item package from the delivery server at a time period when it is required. There may be a case here that firmware update may be desirable in a network device when the setting items include an urgent setting item for security and anti-virus purposes. In addition firmware program updates may be required in various cases such as a case where a business firmware program should be applied but a general firmware program is applied instead, a case where old setting items are left in a network device which manages the set-value management server, and a case where a setting item has a bug.

Though such a delivery server is capable of delivering a firmware program remotely, the remote delivery of a firmware program is not performed to a network device holding a delivery permission flag being OFF. A general delivery permission flag has a setting not to permit an external operation from a delivery server, for example. Thus, conventionally, a delivery server is not permitted to perform remote delivery of a firmware program to a network device holding a delivery permission flag being OFF.

In this case, in order to perform remote delivery of a firmware program, a serviceman may be required to go to the setup location of the network device and turn on the delivery permission flag in the network device, for example. In this case, when a large number of network devices are the targets of the delivery, it may require an enormous amount of labor and costs for the serviceman, taking time until the delivery of the firmware program. Therefore, quick application of a software program such as a firmware program to a network device is not provided disadvantageously.

SUMMARY OF THE INVENTION

The present invention provides a mechanism for achieving quick application to a network device of a software program such as a firmware program through remote delivery.

A network system having a delivery system controlling delivery of a software program to a network device and a setting management system managing set values for the network device includes a determining unit, in the delivery system, configured to determine whether a flag for permitting a software program delivery from the delivery system within the network device being a delivery target of a software program is activated or not, an instructing unit, in the delivery system, configured to instruct the setting management system to activate the flag of the delivery target network device when it is determined that the flag is not activated, an activating unit, in the setting management system, configured to activate the flag of the network device in response to the instruction, a notifying unit, in the setting management system, configured to notify the delivery system of completion of the activation of the flag of the network device, and a delivery control unit, in the delivery system, configured to prepare a delivery of the software program in response to the notification. In this case, the delivery control unit controls the delivery of the software program in response to a request from the network device with the activated flag after the preparation for the delivery.

Further features of the present invention will become apparent from the following description of exemplary embodiments with reference to the attached drawings.

BRIEF DESCRIPTION OF THE DRAWINGS

FIGS. 7A and 7B illustrate a sequence diagram in a network system according to an exemplary embodiment.

FIG. 8 illustrates a set package request information to be transmitted from a set-value management server.

FIG. 9 is a setting item package table held in the delivery server.

FIG. 10 illustrates a setting item package to be received by the set-value management server from the delivery server.

FIG. 11 illustrates a setting item table held in the set-value management server.

FIG. 12 illustrates firmware-program delivery condition table.

FIG. 13 illustrates firmware delivery instruction information from the set-value management server.

FIG. 14 is a delivery permission flag table held in the delivery server.

FIG. 16 is a flowchart illustrating a process to be performed by the monitoring center host.

FIGS. 18A and 18B are flowcharts illustrating processes to be performed by the delivery server.

DESCRIPTION OF THE EMBODIMENTS

Figure 1:
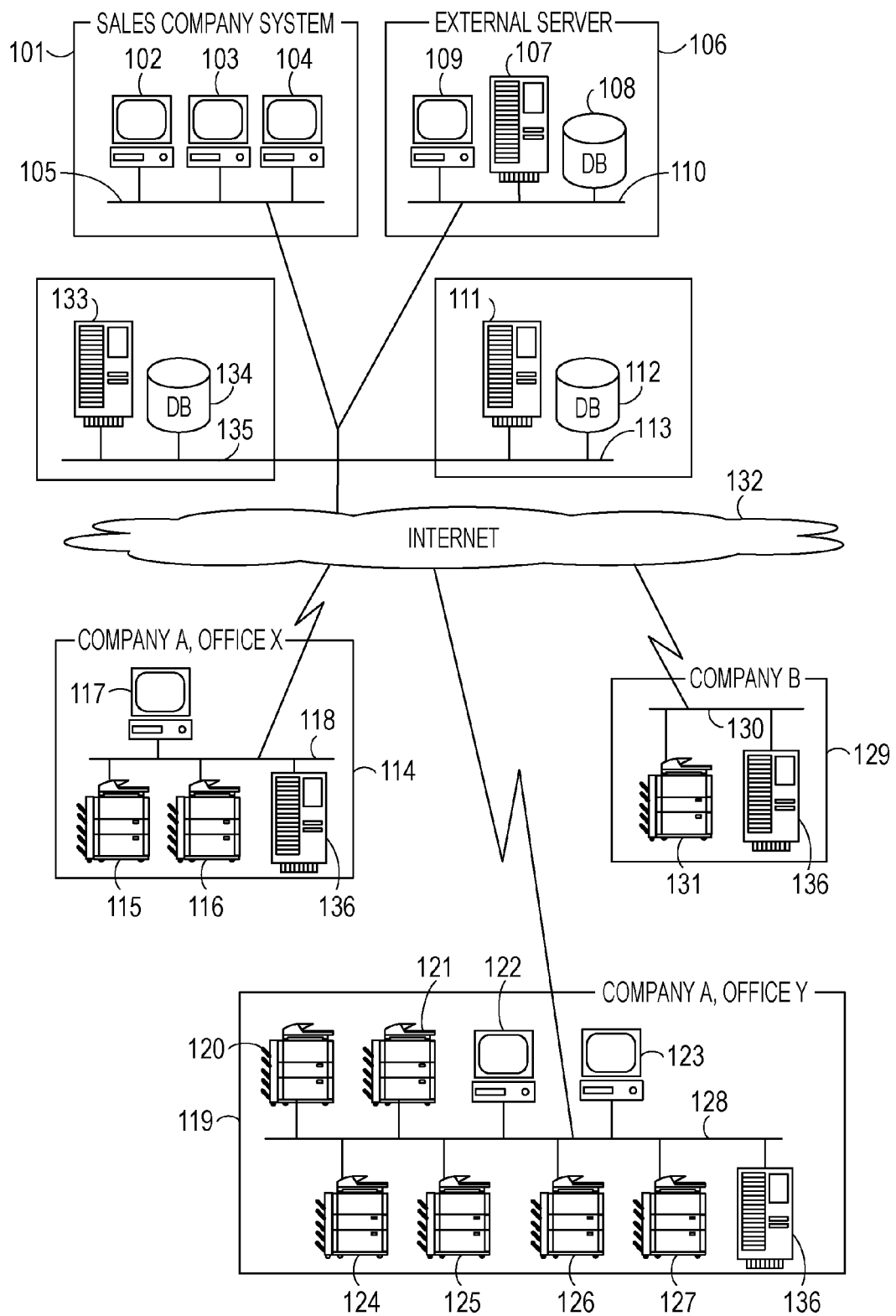
FIG. 1 is a block diagram of a network system according to an exemplary embodiment.

Exemplary embodiments of the present invention will be described below with reference to drawings. FIG. 1 illustrates a configuration of a network system according to an exemplary embodiment of the present invention. Referring to FIG. 1, a plurality of systems is connected. It should be noted that the present invention may be implemented by any configuration by which equivalent functions to those of the configuration illustrated in FIG. 1 can be achieved, and the same configuration as the one illustrated in FIG. 1 is not required.

A sales company system 101 includes PCs 102, 103, and 104. The PCs 102, 103, and 104 are information processing apparatuses such as a personal computer. The PCs 102, 103, and 104 may access Web sites provided by a monitoring center host 111 and a delivery server 133 to view data and make a reservation for delivery of a software program. The PCs 102, 103, and 104 are connected over a LAN 105.

A host 107 and a database 108 are connected to an external server 106 over the LAN 110. The external server 106 provides a service for delivering a software program for the delivery server 133 at a high speed. A PC 109 is connected to the LAN 110.

Next, the monitoring center host 111 will be described.

The monitoring center host 111 is a network device monitoring system having a database 112. The database 112 is a database functioning as a history storage unit configured to store information regarding monitoring and an operating state of a network device. Hereinafter, an apparatus running on a network according to the present invention such as an image formation apparatus will be called a network device. The monitoring center host 111 and the database 112 are connected by a LAN 113, and the LAN 113 is connected to the Internet 132. It should be noted that the database 112 may physically exist within the monitoring center host 111. The database 112 may further exist at a separate location over the Internet 132 if the database 112 is accessible from the monitoring center host 111.

The monitoring center host 111 are capable of collecting monitoring apparatuses 117, 122, and 123 and a network device 131, storing, and modifying information regarding a network device which is a monitoring target and information regarding operating states from and externally providing a warning, for example.

Next, the delivery server 133 will be described.

The database 134 is a database functioning as a storage unit configured to store a software program to be applied to a network device. The delivery server 133 and the database 134 are connected over a LAN 135, and the LAN 135 is connected to the Internet 132. It should be noted that the database 134 may physically exist within the delivery server 133. The database 134 may further exist at a separate location over the Internet 132 if the database 134 is accessible by the delivery server 133. The LAN 113 and the LAN 135 may be one LAN, and the database 134 and the database 112 may exchange data. The delivery server 133 and database 134 are included in a delivery system configured to perform control over delivery of a software program to a network device.

A firmware program to be delivered is registered with the delivery server 133 which may then make the firmware program available to the sales company system 101. The firmware program made available thereby can be downloaded from the PCs 102, 103, and 104 in the sales company system 101 and network devices 115, 116, 120, 121, 124, 125, 126, 127, and 131 under control of the sales company system.

FIG. 1 only illustrates one monitoring center host 111 and one database 112, and one delivery server 133 and one database 134. However, actually, a plurality of monitoring center hosts 111 and databases may be caused to perform delivery processing for information collecting from many network devices and monitoring apparatuses and load distribution of the software delivery.

Next, a set-value management server 136 will be described.

The set-value management server 136 is connected to the LAN to which a plurality of network devices is connected, which configures a setting management system configured to manage set values for the network devices. The set-value management server 136 downloads a setting item package from the delivery server 133 periodically or when a firmware program in a managed network device is updated.

Next, a system configuration provided on a customer side will be described.

The configuration of system provided on a customer side varies in accordance with the customer. FIG. 1 illustrates customer systems 114, 119, and 129.

In the customer system 114 (Company A, Office X), the network devices 115 and 116 connected to a LAN 118 connected to the Internet 132 is monitored by the monitoring apparatus 117. The monitoring apparatus 117 is in communication with the monitoring center host 111 over the Internet 132.

In the customer system 119 (Company A, Office Y), network devices connected to the LAN 128 are monitored by the monitoring apparatus 122, 123. The monitoring apparatus 122 manages the network devices 120, 121, 124, and 125, and the monitoring apparatus 123 manages the network devices 126, and 127.

In the customer system 129 (Company B), the network device 131 itself connected to the LAN 130 connected to the Internet 132 is in direct communication with the monitoring center host 111 over the Internet 132. The network device 131 has equivalent functions to those of the monitoring apparatuses 117, 122, and 123 and transmits its operation information to the monitoring center host 111. The network device 131 has a controller for applying a firmware program downloaded from the delivery server 133. Similarly, each of the network devices 115, 116, 120, 121, 124, 125, 126, and 127 has a controller for applying a firmware program downloaded from the delivery server 133.

Figure 2:
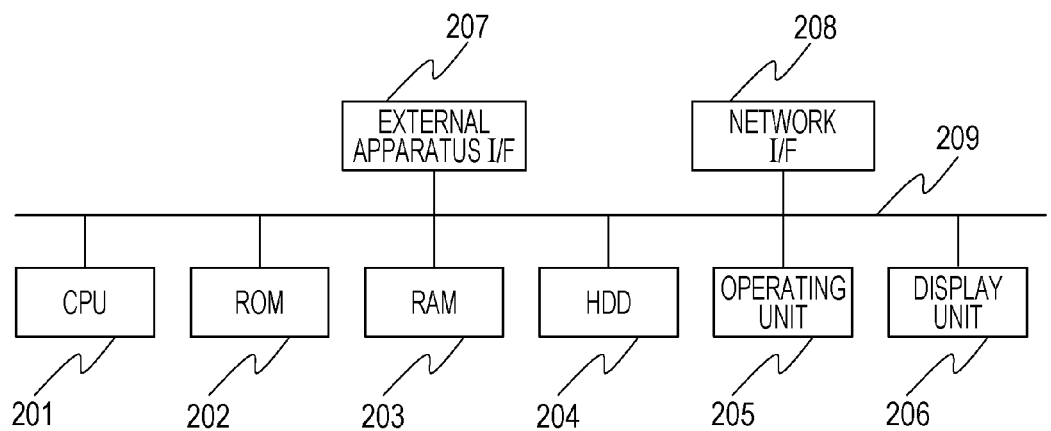
FIG. 2 is a hardware block diagram of a monitoring center host, for example.

FIG. 2 illustrates a hardware configuration of the monitoring center host 111. Each of the delivery server 133, set-value management server 136, host 107, monitoring apparatuses 117, 122, and 123, and PCs 102, 103, 104, and 109 has the same hardware configuration as that of the monitoring center host 111.

Figure 4:
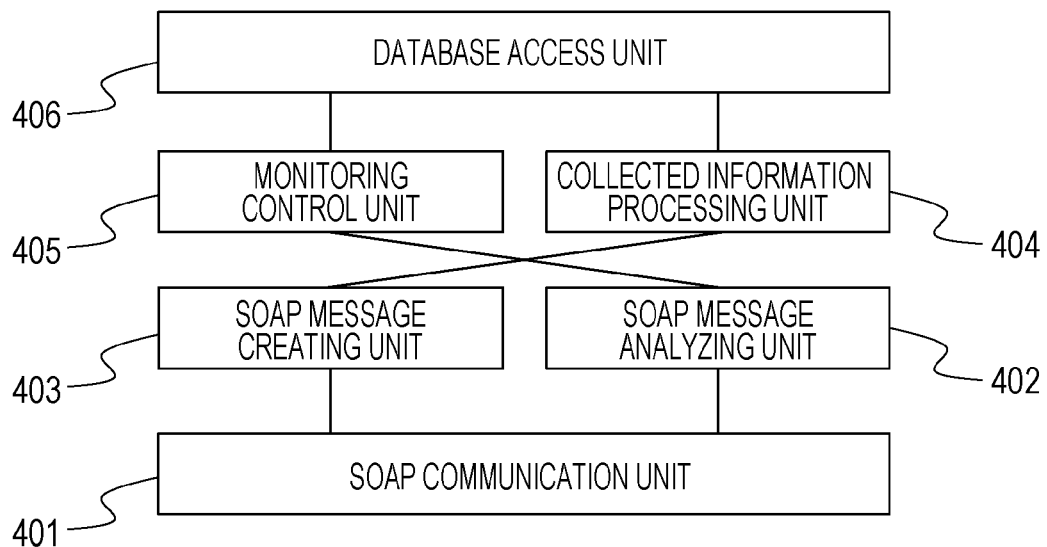
FIG. 4 is a software block diagram of a communication portion of a monitoring center host and a delivery server.

Referring to FIG. 2, the CPU 201 controls processes performed in the present apparatus. A non-rewritable ROM 202 stores programs and data associated with processes performed in the present apparatus. A RAM 203 is capable of electrically storing temporary data associated with processes performed in the present apparatus and is rewritable. The HDD 204 is a hard disk drive configured to store programs and data associated with processes to be performed in the present apparatus, which will be described below, temporary data, information regarding a network device to be monitored, and information collected from network devices, for example. For example, operation information or the like may be stored in the HDD 204. For the monitoring center host 111 and the delivery server 133, programs for implementing software configurations illustrated in FIG. 4 are stored in the HDD 204. These programs are invoked and are executed by the CPU 201 by using the RAM 203 as a temporary storage area.

An operating unit 205 may be a keyboard and a pointing device (such as a mouse) for receiving input of an instruction, for example, to the present apparatus. A display unit 206 may display an operation condition of the present apparatus and information output from programs running on the apparatus. A network I/F 208 connects to the LAN and the Internet 132 over a network and exchange information with external apparatuses and devices. An external apparatus I/F 207 accepts connection of an external storage device. The components 201 to 208 are connected via a system bus 209 for data exchange.

Figure 3:
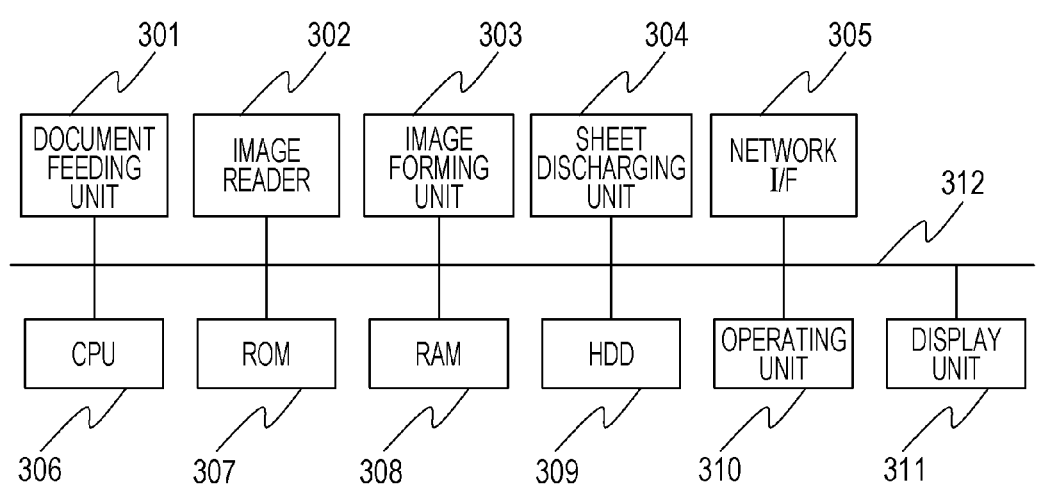
FIG. 3 is a hardware block diagram of a network device.

FIG. 3 illustrates a hardware configuration of the network devices 115, 116, 120, 121, 124, 125, 126, 127, and 131.

More specifically, the network devices may include a multi-function peripheral (MFP) in which a printer and a facsimile function are provided integrally, a printer (of any of electrophotographic, inkjet and other printing methods) configured to receive and print data from a PC, for example, a scanner, a facsimile and so on. FIG. 3 illustrates a configuration of a multi-function peripheral as an example of the network device.

An image reader 302 reads a document in a document feeder 301. An image forming unit 303 is configured to convert data of a document read by the image reader 302 and data received over a network through the network I/F 305 to a print image which is then printed and is output. A sheet discharging unit 304 is configured to perform processing such as discharging a printed and output sheet, and sorting, and/or stapling such sheets. A network I/F 305 connects to the LAN and the Internet 132 over a network and exchange information with external apparatuses and devices.

The CPU 306 controls processes performed in the present apparatus. The CPU 306 monitors an operation state of the network device and, if a specific event such as a failure occurs, transmits condition information describing the state to a predetermined destination. The destination may be the monitoring center host 111 or a monitoring apparatus, for example. A non-rewritable ROM 307 is configured to store programs and data associated with processes performed in the present apparatus. A RAM 308 is capable of electrically storing temporary data associated with processes performed in the present apparatus and is rewritable. An HDD 309 stores programs and data associated with processes performed in the present apparatus, which will be described below, temporary data, and user data to be transmitted to the present apparatus. The network device stores programs for implementing the software configuration illustrated in FIG. 5, which will be described below, in the HDD 309. Those programs are invoked and are executed by the CPU 306 by using the RAM 308 as a temporary storage area.

An operating unit 310 receives input of an instruction, for example, to the present apparatus. A display unit 311 may display an operation condition of the present apparatus and information regarding operations performed on the operating unit 310. The components 301 to 311 are connected via a system bus 312 for data exchange.

The network device 131 holds programs and data associated with processing for transmitting monitoring data within the ROM 307 or HDD 309 if the network device 131 is capable of transmitting information for monitoring.

FIG. 4 illustrates a software configuration of communication portions in the monitoring center host 111 and in the delivery server 133. It should be noted that the units illustrated in FIG. 4 are implemented by programs stored in the ROM 202 or HDD 204 and invoked and executed by the CPU 201 in each of the monitoring center host 111 and the delivery server 133.

A SOAP communication unit 401 is configured to pass SOAP data received from the monitoring apparatus 117, 122, or 123 or the network device 131 through the network I/F 208 to a SOAP message analyzing unit 402. The SOAP communication unit 401 transmits SOAP data created by a SOAP message creating unit 403 to the monitoring apparatus 117, 122, or 123 or the network device 131 through the network I/F 208.

A collected information processing unit 404 stores information received from the monitoring apparatus 117, 122, or 123 or the network device 131 as it is or by modifying it to the database 112 or database 134 through a database accessing unit 406.

A monitoring control unit 405 in the monitoring center host 111 controls schedule management regarding the monitoring apparatus 117, 122, or 123 or the network device 131. The delivery server 133 controls polling processing to be performed on the monitoring apparatus 117, 122, or 123 or the network device 131.

Figure 5:
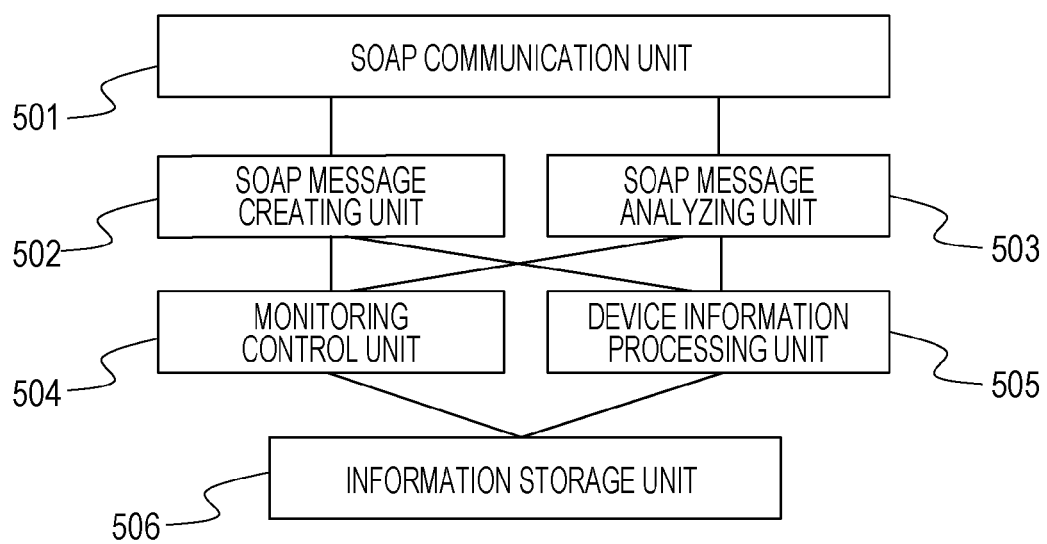
FIG. 5 is a software block diagram of a communication portion of a monitoring apparatus and a network device.

FIG. 5 illustrates a software configuration of communication portions in the monitoring apparatus 117, 122, or 123 or the network device 131. It should be noted that the units illustrated in FIG. 5 are implemented by programs stored in the ROM 202 or HDD 204 and invoked and executed by the CPU 201 in a monitoring apparatus if they are included in the monitoring apparatus as described above. It should be noted that the units illustrated in FIG. 5 are implemented by programs stored in the ROM 307 or HDD 309 and invoked and executed by the CPU 306 in a network device if they are included in the network device.

A SOAP communication unit 501 is configured to pass SOAP data received from the monitoring center host 111 or the delivery server 133 through the network I/F 208 to a SOAP message analyzing unit 503. The SOAP data created by a SOAP message creating unit 502 is transmitted to the monitoring center host 111 or the delivery server 133 through the network I/F 208.

A monitoring control unit 504 may be configured to update information regarding a monitored network device held in the information storage unit and acquire the information regarding the network device 115 or 116. A device information processing unit 505 is configured to store operation information regarding a network device in an information storage unit 506. The data stored in the information storage unit 506 is passed as it is to the SOAP message creating unit 502 through the device information processing unit 505 and is then transmitted to the monitoring center host 111.

Regarding the monitoring center host 111, delivery server 133 or monitoring apparatuses 117, 122, and 123 or a network device, a processing program the present invention to be executed is loaded onto the RAM 203 for the monitoring center host 111 or monitoring apparatus 117, 122, or 123 and is loaded onto the RAM 308 for the network device, though not illustrated. For example, a basic I/O program and a system program, and processing programs including a processing program according to this exemplary embodiment are loaded onto a RAM, and an area for storing associated data and a work area for the programs are also provided. The basic I/O program controls input/output performed to/from the apparatus. The system program provides an operation environment to each of the processing programs.

Figure 6:
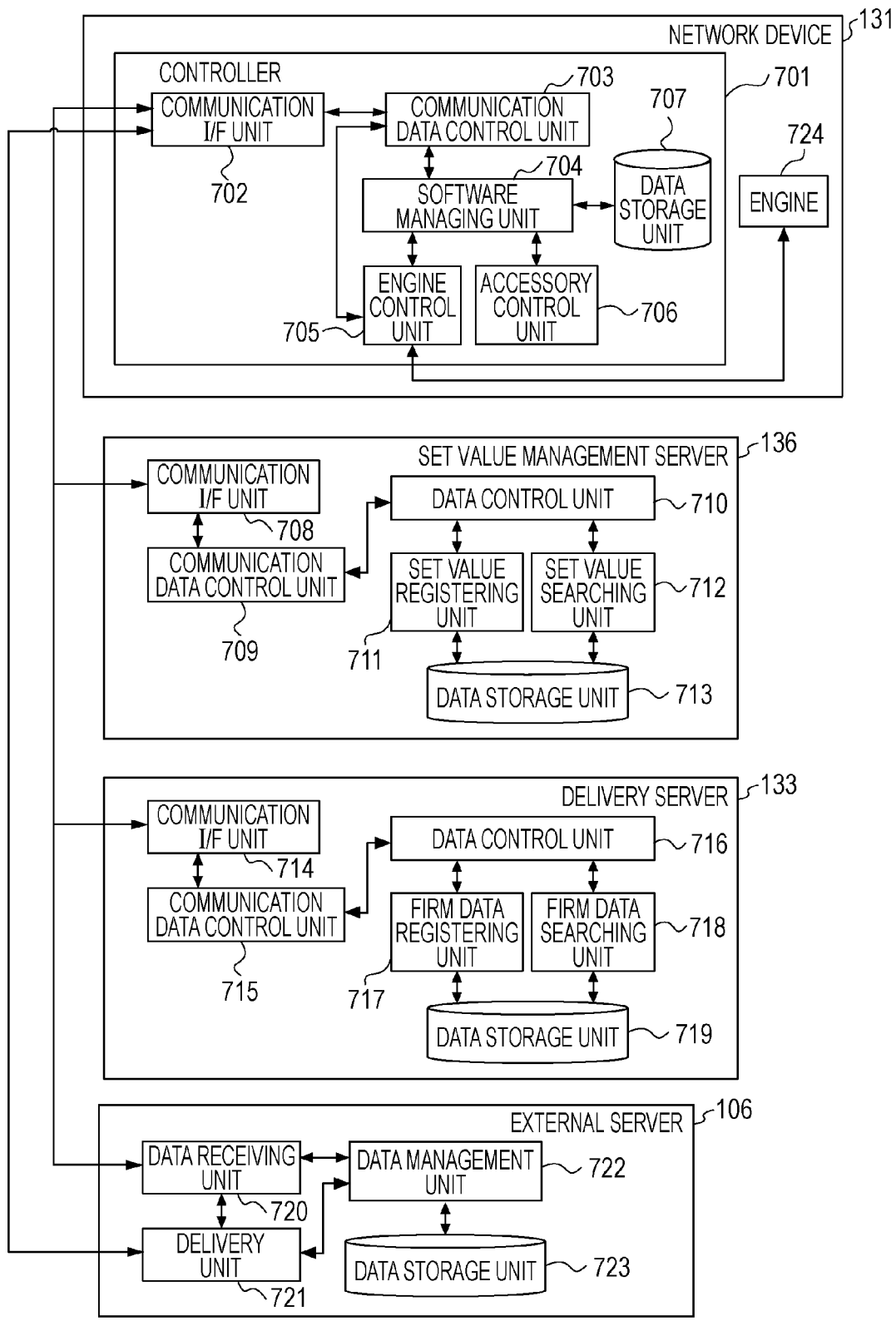
FIG. 6 is a software block diagram of a network system according to an exemplary embodiment.

FIG. 6 illustrates a software configuration of the network system according to this exemplary embodiment.

First of all, the network device 131 will be described.

A controller 701 includes software components 702 to 707. The network device 131 includes the controller 701 and an engine 724 controlled by the controller 701. The controller 701 includes the CPU 306, ROM 307, RAM 308, HDD 309, and network I/F 305 in the network device 131. In other words the components 702 to 707 may be implemented by programs stored in the ROM 307 or HDD 309 and invoked and executed by the CPU 306 in the network device 131.

The component 702 is also called a communication I/F unit 702. The communication I/F unit 702 controls communications between the controller 701 and the set-value management server 136, the delivery server 133, and the external server 106. The component 703 is also called a communication data control unit 703 in the controller 701. The communication data control unit 703 controls communication data received from the communication I/F unit 702.

The component 704 is also called a software program management unit 704. The software program management unit 704 receives a software program from the external server 106 based on URL information received from the delivery server 133 and plays a role of installing an engine control unit 705 and an accessory control unit 706. The component 707 is also called a data storage unit 707. The data storage unit 707 stores software program data within the controller and is also used as a temporary storage area.

Next, the set-value management server 136 will be described.

Software components 708 to 713 are included in a software program included in the set-value management server 136. In other words, the components 708 to 713 are implemented by programs stored in the ROM 202 or HDD 204 and invoked and executed by the CPU 201 in the set-value management server 136.

The component 708 is also called an communication I/F 708 in the set-value management server 136. The communication I/F unit 708 is usable for the communication between the controller of a network device and the set-value management server 136. The component 709 is also called a communication data control unit 709 in the set-value management server 136. The communication data control unit 709 controls communication data received from the communication I/F unit 708.

The component 710 is also called a data control unit 710. The data control unit 710 controls data within the set-value management server 136. The component 711 is also called a set value registering unit 711. The set value registering unit 711 registers information regarding a set value (or set value information) with the data storage unit 713 and the database 108. The component 712 is also called a set value searching unit 712. The set value searching unit 712 searches a set value through the data storage unit 713. The component 713 is also called a data storage unit 713. The data storage unit 713 stores set value information within the set-value management server 136.

Next, the delivery server 133 will be described.

The delivery server 133 includes a software program including components 714 to 719. In other words, the components 714 to 719 are implemented by programs stored in the ROM 202 or HDD 204 and invoked and executed by the CPU 201 in the delivery server 133.

The component 714 is also called a communication I/F 714 in the delivery server 133. The communication I/F unit 714 is usable for the communication between a controller in a network device and the delivery server 133. The component 715 is also called a communication data control unit 715 in the delivery server 133. The communication data control unit 715 controls communication data received from the communication I/F unit 714.

The component 716 is also called a data control unit 716. The data control unit 716 controls data within the delivery server 133. The component 717 is also called a firmware data registering unit 717. The firmware data registering unit 717 registers information regarding a software program with the data storage unit 719. The component 718 is also called a firmware data searching unit 718. The firmware data searching unit 718 searches a software program through the data storage unit 719. The component 719 is also called a data storage unit 719. The data storage unit 719 stores data in the database 134 storing information regarding firmware data for delivery within the delivery server 133.

Next, the external server 106 will be described.

The external server 106 includes a software program including components 720 to 723. In other words, the components 720 to 723 are implemented by programs stored in the ROM 202 or HDD 204 and invoked and executed by the CPU 201 in the external server 106.

The external server 106 is authorized for a service of delivering a software program in the delivery server 133 at a high speed and receives software program data periodically transferred from the delivery server 133. The component 720 is also called a data receiving unit 720. The data receiving unit 720 receives software program data transferred from the delivery server 133. The component 721 is also called a delivery unit 721. The delivery unit 721 delivers data registered with the data storage unit 723 to the controller 701 at a high speed. The component 722 is also called a data management unit 722. The data management unit 722 causes data received from the data receiving unit 720 into the data storage unit 723. The data management unit 722 supplies data to be delivered to the delivery unit 721. The component 723 is also called a data storage unit 723.

FIGS. 7A and 7B illustrate a representative sequence in the network system according to this exemplary embodiment. This sequence corresponds to processing including acquiring setting item package from the delivery server 133 by the set-value management server 136 and delivering a firmware program from the delivery server 133 to the network device 131. It should be noted that the processing in the network device illustrated on this sequence diagram is implemented by programs stored in the ROM 307 or HDD 309 and invoked and executed by the CPU 306 in the network device. The processing to be performed in the set-value management server 136 is implemented by programs stored in the ROM 202 or HDD 204 and invoked and executed by the CPU 201 in the set-value management server 136. The processing to be performed in the delivery server 133 is implemented by programs stored in the ROM 202 or HDD 204 and invoked and executed by the CPU 201 in the delivery server 133. The processing in the monitoring center host 111 is implemented by programs stored in the ROM 202 or HDD 204 and invoked and executed by the CPU 201 in the monitoring center host 111.

In S801, the set-value management server 136 requests a setting item package to the delivery server 133. FIG. 8 illustrates set package request information 901 transmitted from the set-value management server 136 to the delivery server 133. The set-value management server 136 transmits set package request information 901 including a serial number 902 of a network device managed by the set-value management server 136 and a main controller version 903 to the delivery server 133.

FIG. 8 illustrates set package request information 901 to be transmitted from the set-value management server 136 to the delivery server 133.

A network device serial number 902 is used for uniquely identifying a network device. A main controller of the network device is of a version 903. Though data in JSON is illustrated in FIG. 8, other data formats such as SOAP may be applicable is the present invention can be implemented.

In S802, the delivery server 133 receives a request for a setting item package from the set-value management server 136. The delivery server 133 thereupon receives the set package request information 901 transmitted from the set-value management server 136 to the delivery server 133 and compares it with items on a setting item package table 1001 illustrated in FIG. 9.

FIG. 9 illustrates the setting item package table 1001 held in the delivery server 133.

The setting item package table 1001 includes a range 1002 of network device serial numbers. The model of a network device depends on the range of the serial numbers. The setting item package table 1001 includes a main controller version 1003 of a network device. The setting item package table 1001 further includes a file name of a setting item package 1004. The setting item package table 1001 further includes a URL 1005 of a setting item package.

In S802, the delivery server 133 first searches the range of the network device serial numbers 1002 including the serial number 902 of the network device. Next, the delivery server 133 searches the same main controller version as the main controller version 903 from the main controller version 1003. As a result, in the examples illustrated in FIGS. 8 and 9, the setting item packages 1006 and 1007 in FIG. 9 are retrieved as a delivery target.

Next, in S803, the delivery server 133 returns the URLs 1005 of the setting item packages 1006 and 1007 to the set-value management server 136 as a search result of the processing in S802. Because the data of a setting item package exists in the database 134 in the delivery server 133, the URL 1005 describes a path to the database 134.

In S804, the set-value management server 136 accesses the URLs 1005 of the setting item packages returned from the delivery server 133 in the processing in S803 and downloads the setting item packages 1006 and 1007. The setting item package 1006 has a configuration 1101 illustrated in FIG. 10.

FIG. 10 illustrates an example setting item package received by the set-value management server 136 from the delivery server 133.

FIG. 10 illustrates a setting item package table 1101 including information of a setting item package name: sss003.bat, a range of network device serial numbers: AAA00001 to AAA99999, and a main controller version: 80.01.

The information includes a set value key 1102 usable for uniquely identifying a setting item. The information further includes a default value 1103 of a setting item. The information further includes an emergency level 1104. The information further includes a category 1105 of a setting item. The information further includes customer information 1106 corresponding to a setting item. A new setting item 1107 corresponds to the setting item described above.

Because the setting item packages 1007 and 1006 have substantially the same configuration, the repetitive descriptions will be omitted.

The set-value management server 136 receives the setting item packages 1006 and 1007 from the delivery server 133 and reflects them to its own setting item table 1201. FIG. 11 illustrates a set value table held by the set-value management server 136.

FIG. 11 illustrates a setting item table 1201 held by the set-value management server 136.

The setting item table 1201 includes a setting item 1202. The setting item table 1201 further includes a set value key 1203 usable for uniquely identifying a setting item. The setting item table 1201 further includes a default value 1204 of a setting item. The setting item table 1201 further includes an emergency level 1205. The setting item table 1201 further includes a category 1206 of a setting item. The setting item table 1201 further includes customer information 1207 corresponding to a setting item. The setting item table 1201 further includes a range 1208 of network device serial numbers corresponding to a setting item. An item 1209 corresponds to the new setting item 1107 described above.

In S805, the set-value management server 136 determines whether the setting item packages 1006 and 1007 has a new item or not with reference to the setting item table 1201. The reference includes a comparison between the set value keys 1102 and 1203. When the set value key 1102 has a set key which does not exist in the set key 1203, the existence of a new item is determined. In this exemplary embodiment, the setting item of the set value key 1107 in FIG. 10 is added as a new item as a set value key 1209 in FIG. 11.

If it is determined in S805 above that no new item exists (No in S805), the set-value management server 136 ends the processing. On the other hand, if it is determined that a new item exists (Yes in S805), the set-value management server 136 advances the processing to S806.

In S806, the set-value management server 136 adds the new item to the setting item table 1201, and the processing moves to S807.

In S807, the set-value management server 136 compares the new item in the setting item table 1201 and the firmware-program delivery condition table 1301 illustrated in FIG. 12 to determine whether any item satisfying the delivery condition for a firmware program exists or not.

FIG. 12 illustrates a firmware-program delivery condition table 1301 held by the set-value management server 136.

The firmware-program delivery condition table 1301 includes a firmware program delivery condition 1302. The firmware-program delivery condition table 1301 further includes an execution flag 1303 having a status "active" or "inactive" as flag information usable for determining whether a firmware program satisfying the firmware program delivery condition 1302 can be delivered or not. The firmware-program delivery condition table 1301 further includes customer information 1304 of a network device managed by the set-value management server 136.

If it is determined in S807 above that no firmware program satisfies the delivery condition (No in S807), the set-value management server 136 ends the processing without performing anything. On the other hand, if it is determined that a firmware program satisfying the delivery condition exists (Yes in S807), the set-value management server 136 advances the processing to S808. In the series of examples, whether the emergency level 1205, category 1206, and customer information 1207 of the new item 1209 satisfy the firmware program delivery condition 1302 or not are determined. As a result, a condition 1305 of "the new setting item has an emergency level A" and a condition 1306 of "the new setting item has a category of security" are applicable. Next, because the execution flag 1303 of the firmware program delivery is "active" for the conditions 1305 and 1306, it can be determined to instruct to deliver the firmware program.

In S808, the set-value management server 136 instructs the delivery server 133 to deliver the firmware program. FIG. 13 illustrates information 1401 regarding a network device to which the firmware is to be delivered from the set-value management server 136 to the delivery server 133 (hereinafter, called target network device information 1401) in response to the instruction to deliver the firmware program.

The target network device information 1401 includes a network device serial number 1402 which is a number for uniquely identifying and indicating a network device to which the firmware program is to be delivered. For example, the set-value management server 136 defines as a firmware program delivery target the network device corresponding to the setting item package including a new item satisfying the firmware program delivery condition among the network device managed by the set-value management server 136. However, the method for determining the network device to which the firmware program is to be delivered by the set-value management server 136 is not limited to the aforementioned method.

In S809, the delivery server 133 receives the target network device information 1401 from the set-value management server 136. The delivery server 133 then refers to its own database 134 to check the status of the delivery permission flag within a plurality of network devices designated in the target network device information 1401 by the set-value management server 136. FIG. 14 illustrates a delivery permission flag table 1501 held in the database 134 by the delivery server 133.

The delivery permission flag table 1501 includes a network device serial number 1502 which is a number for uniquely identifying a network device. The delivery permission flag table 1501 further includes a status 1503 of the delivery permission flag in a network device. Each network device internally holds a delivery permission flag (which will also be called a cooperation flag). The status of the delivery permission flag for each network device is stored in the delivery permission flag table 1501 held by the delivery server 133 in the database 134. "ON" indicates that the delivery permission flag is activated, and a network device with the delivery permission flag having ON is permitted to receive software program delivery from the delivery server 133. On the other hand, "OFF" indicates that the delivery permission flag is inactivated, and a network device with a delivery permission flag being OFF is not permitted to receive software program delivery from the delivery server 133. On the delivery permission flag table 1501, network devices 1504 and 1505 have the delivery permission flag being OFF.

The delivery server 133 refers to the delivery permission flag table 1501 to check the status of the delivery permission flag of the applicable network device included in the target network device information 1401. As a result, whether the delivery permission flags for the network devices 1504 and 1505 are required to be switched from "OFF" to "ON" can be determined.

In S810, the delivery server 133 determines whether there is a network device with the delivery permission flag being OFF (a network device having a delivery permission flag required to be turned on) or not based on the result of the reference to the delivery permission flag table 1501 in S809 above. If it is determined that there is no network device with the delivery permission flag being OFF (having the delivery permission flag not required to be turned on) (No in S810), the delivery server 133 advances the processing to S812.

In S812, because the delivery permission flag is not required to be changed, the delivery server 133 returns ACK to the set-value management server 136, and the processing moves to S819.

On the other hand, if it is determined in S810 that there is a network device with the delivery permission flag being OFF (required to be turned on) (Yes in S810), the delivery server 133 advances the processing to S811.

In S811, the delivery server 133 instructs the set-value management server 136 to change the delivery permission flag.

In S813, the set-value management server 136 receives the instruction to change the delivery permission flag from the delivery server 133.

Next, in S814, the set-value management server 136 instructs the network device to change the delivery permission flag.

In S815, the network device in response to the instruction to change the delivery permission flag advances the processing to S816.

In S816, the network device changes the delivery permission flag and notifies the set-value management server 136 of the completion of the change of the delivery permission flag.

In S817, the set-value management server 136 in response to the notification of the completion of the change of the delivery permission flag notifies the completion of the change of the delivery permission flag to the delivery server 133.

In S818, the delivery server 133 receives the notification of the completion of the change of the delivery permission flag and advances the processing to S819.

In S819, the delivery server 133 defines delivery settings for a network device to which an applicable firmware program is to be delivered (which will be called a delivery target network device). The delivery settings may include the version of the applicable firmware program and a delivery date and time. Though the applicable firmware program is of the latest firmware program version in this exemplary embodiment, the firmware program may be any of versions. The delivery date and time may be an immediate date and time or any other arbitrary date and time. The delivery may be performed on weekend in consideration of the time to be used by a customer. Because the delivery server 133 is capable of periodically updating a firmware program, the delivery date and time may be adjusted in consideration of the periodical update date and time.

Next, in S820, the delivery server 133 notifies the monitoring center host 111 of the delivery information regarding the delivery target network device (delivery preparation). The delivery information includes delivery settings defined in S819 above and target network device information 1401 received from the set-value management server 136.

In S821, the monitoring center host 111 receives the delivery information registers the delivery information. Then, the processing moves to S822. In other words, the delivery preparation performed by the delivery server 133 includes registration of information regarding a network device to which a software program is to be delivered with the monitoring center host 111 being a management system which centrally manages network devices.

In S822, the monitoring center host 111 periodically receives a polling communication from the network device and transmits the delivery information to the network device.

In S823, the network device receives the delivery information from the monitoring center host 111. Then, the processing moves to S824.

In S824, the network device requests for download of the firmware program to the delivery server 133.

In S825, the delivery server 133 accepts the request for download of the firmware program and delivers the firmware program to the network device.

In S826, the network device applies the firmware program delivered in S825 above to update the firmware program and notifies the delivery server 133 of the start of the firmware program update.

In S827, the delivery server 133 receives the notification of the start of the firmware program update.

Next, in S828, when the update completes, the network device notifies the set-value management server 136 and the delivery server 133 of the completion of the update.

In S829, the delivery server 133 receives the notification of the completion of the update.

In S830, the set-value management server 136 also receives the notification of the completion of the update.

In S831, the set-value management server 136 instructs the network device to change the delivery permission flag in order to return the status of the delivery permission flag temporarily changed for the firmware program update to the original status.

In S832, the network device receives the instruction to change the delivery permission flag. The processing then moves to S833.

In S833, the network device changes the status of the delivery permission flag and notifies the set-value management server 136 of the completion of the delivery permission flag change.

In S834, the set-value management server 136 receives the notification of the completion of the delivery permission flag change and then notifies the delivery server 133 of the completion of the delivery permission flag change.

In S835, the delivery server 133 receives the notification of the completion of the delivery permission flag change.

It should be noted that though the delivery permission flag is temporarily turned on and is turned off after the firmware program update in this exemplary embodiment, the delivery permission flag may be changed permanently instead of the temporary change when the delivery permission flag is set improperly. Because the delivery permission flag is activated manually by a serviceman when the corresponding network device is installed in a customer site, it may be improperly set because of an operational error. Therefore, the operational error may be overcome by applying the present invention.

Figure 15A:
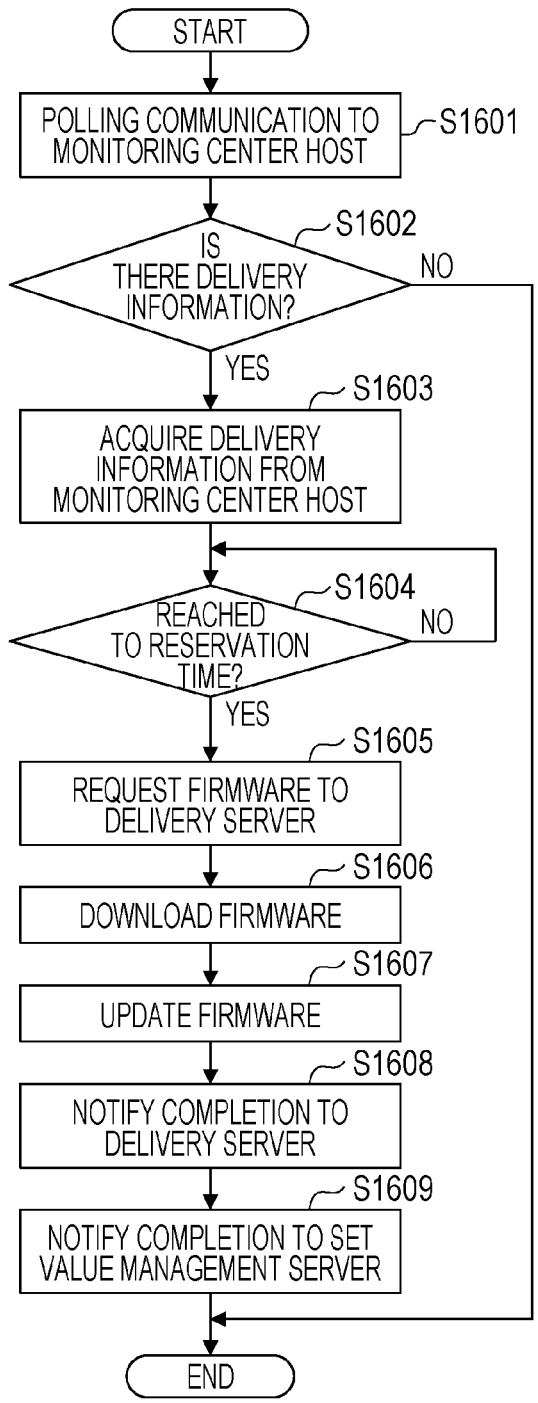
FIGS. 15A and 15B are flowcharts illustrating processes to be performed by a network device.
Figure 15B:
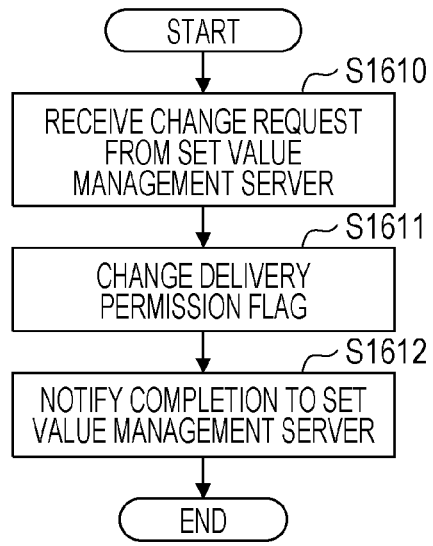

FIGS. 15A and 15B are flowchart illustrating processing to be performed by a network device. The processing illustrated in the flowcharts is implemented by programs stored in the ROM 307 or HDD 309 and invoked and executed by the CPU 306 in the network device. "S" in FIGS. 15A and 15B stands for "step".

First, with reference to FIG. 15A, processing for updating a firmware program in a network device will be described.

In S1601, a network device periodically performs a polling communication to the monitoring center host 111.

Next, in S1602, the network device determines whether there is delivery information in the monitoring center host 111 or not. If not (No in S1602), the network device ends the processing of this flowchart. If it is determined that there is delivery information (Yes in S1602) on the other hand, the network device advances the processing to S1603.

In S1603, the network device acquires the delivery information from the monitoring center host 111.

Next, in S1604, the network device determines whether the delivery reservation time designated in the delivery information acquired in S1603 above has been reached or not. The network device waits until the delivery reservation time and when determines the delivery reserved time has been reached (Yes in S1604) advances the processing to S1605.

In S1605, the network device requests for a firmware program to the delivery server 133.

Next, in S1606, the network device downloads the firmware program requested in S1605 above.

Next, in S1607, the network device updates the firmware downloaded in S1606 above.

Next, in S1608, the network device notifies the delivery server 133 of the notification of the completion. In S1609, the network device notifies the set-value management server 136 of the completion. Then, the processing of the flowchart ends.

Next, with reference to FIG. 15B, processing for changing the status of a delivery permission flag will be described.

In S1610, the network device receives a change request from the set-value management server 136 and advances the processing to S1611.

In S1611, the network device changes the status of the delivery permission flag.

Next, in S1612, the network device notifies the set-value management server 136 of the completion, and the processing of this flowchart ends.

FIG. 16 is a flowchart illustrating firmware program delivery processing to be performed by the monitoring center host 111. It should be noted that the processing illustrated in this flowchart is implemented by programs stored in the ROM 202 or HDD 204 and invoked and executed by the CPU 201 in the monitoring center host 111. "S" in FIG. 16 stands for "step".

First in S1701, the monitoring center host 111 receives delivery information from the delivery server 133 and then advances the processing to S1702.

In S1702, the monitoring center host 111 determines whether a polling communication has been received from a network device or not. The monitoring center host 111 waits until the reception of a polling communication. When it is determined that a polling communication has been received (Yes in S1702), the processing moves to S1703.

In S1703, the monitoring center host 111 transmits the delivery information to the network device, and the processing in the flowchart ends.

Figure 17A:
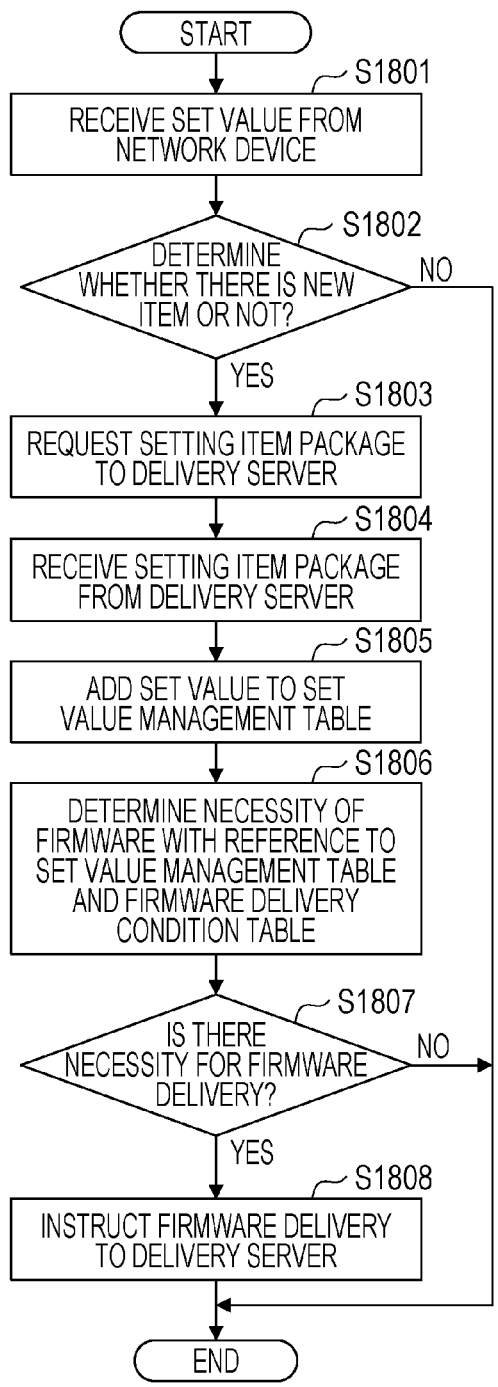
FIGS. 17A and 17B are flowcharts illustrating processes to be performed by the set-value management server.
Figure 17B:
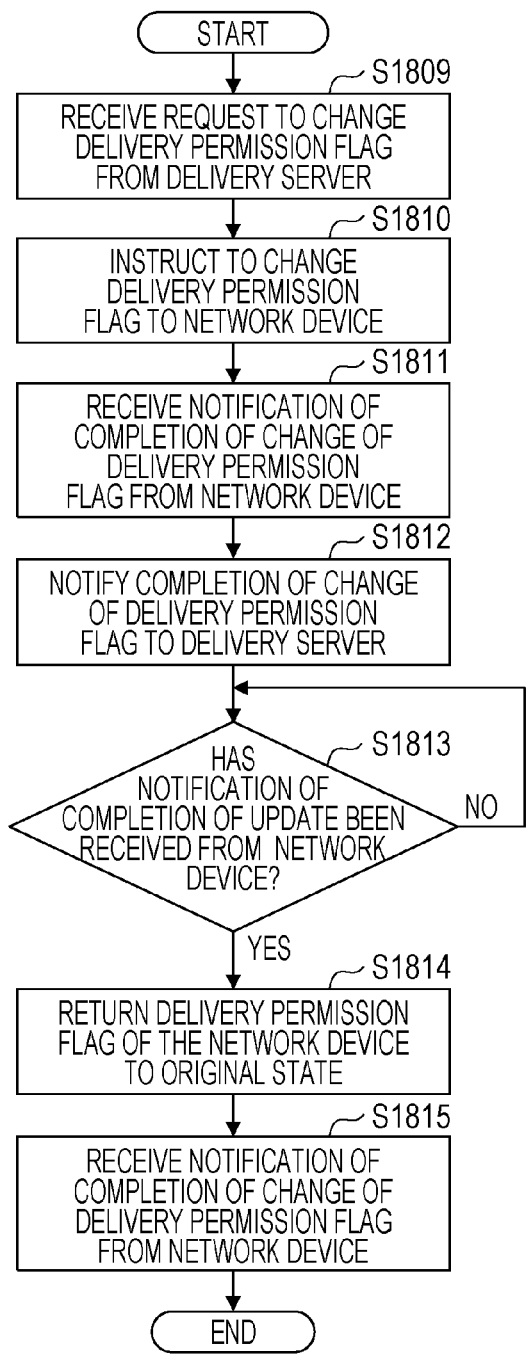

FIGS. 17A and 17B are flowcharts illustrating processing to be performed by the set-value management server 136. It should be noted that the processing illustrated in the flowcharts is implemented by programs stored in the ROM 202 or HDD 204 and invoked and executed by the CPU 201 in the set-value management server 136. "S" in FIGS. 17A and 17B stands for "step".

First, with reference to FIG. 17A, the processing for acquiring a setting item package and instructing to deliver a firmware program to be performed by the set-value management server 136 will be described.

In S1801, the set-value management server 136 receives set values from a network device periodically or when the firmware program is changed. The processing moves to S1802.

In S1802, the set-value management server 136 determines whether the there is any new item in the set value or not. If it is determined that there is no new item in the set values (No in S1802), the set-value management server 136 ends the processing in the flowchart.

On the other hand, if it is determined that there is a new item in the set values (Yes in S1802), the set-value management server 136 advances the processing to S1803.

In S1803, the set-value management server 136 requests the setting item package 1101 to the delivery server 133 in order to acquire data of the new item determined in S1802.

Next, in S1804, the set-value management server 136 receives the setting item package 1101 from the delivery server 133.

Next, in S1805, the set-value management server 136 adds set values to the setting item table 1201.

Next, in S1806, the set-value management server 136 determines the necessity for firmware program delivery with reference to the setting item table 1201 and the firmware-program delivery condition table 1301. In S1807, the set-value management server 136 determines that the firmware program delivery is not necessary (No in S1807) the processing in this flowchart ends.

On the other hand, if the set-value management server 136 determines in S1807 that the firmware program delivery is necessary (Yes in S1807), the processing moves to S1808.

In S1808, the set-value management server 136 instructs the firmware program delivery to the delivery server 133, and the processing in the flowchart ends.

Next, with reference to FIG. 17B, the processing for changing the status of the delivery permission flag to be performed by the set-value management server 136 will be described.

In S1809, the set-value management server 136 receives a request for changing the status of the delivery permission flag from the delivery server 133. Then, the processing moves to S1810.

In S1810, the set-value management server 136 instructs a network device corresponding to the request to change the status of the delivery permission flag received in S1809 above (hereinafter, the target network device) to change the status of its delivery permission flag.

In S1811, the set-value management server 136 receives a notification of the completion of the change of the status of the delivery permission flag from the network device instructed to change the status of the delivery permission flag in S1810 above. Then, the processing moves to S1812.

In S1812, the set-value management server 136 notifies the delivery server 133 of the completion of the change of the status of the delivery permission flag.

Next, in S1813, the set-value management server 136 waits until it receives a notification of the completion of an update of the firmware program from the target network device. If it is determined that the notification of the completion of an update of the firmware program is received (Yes in S1813), the processing moves to S1814.

In S1814, the set-value management server 136 instructs the target network device to return the status of the delivery permission flag of the target network device.

Next, in S1815, the set-value management server 136 receives a notification of the completion of the change of the status of the delivery permission flag from the target network device. The set-value management server 136 then notifies the delivery server 133 of the completion of the change of the status of the delivery permission flag. The processing in this flowchart then ends.

FIGS. 18A and 18B are flowcharts illustrating processing to be performed by the delivery server 133. It should be noted that the processing illustrated in the flowcharts is implemented by programs stored in the ROM 202 or HDD 204 and invoked and executed by the CPU 201 in the delivery server 133. "S" in FIGS. 18A and 18B stands for "step".

First, with reference to FIG. 18A, processing for delivering a setting item package to be performed by the delivery server 133 will be described.

In S1901, the delivery server 133 receives a request for a setting item package 1101 from the set-value management server 136. The processing then moves to S1902.

In S1902, the delivery server 133 determines whether the setting item package 1101 exists or not with reference to the setting item package table 1001. If it is determined that the setting item package 1101 does not exist (No in S1902), the delivery server 133 ends the processing in the flowchart.

On the other hand, if it is determined that the setting item package 1101 exists (Yes in S1902), the delivery server 133 advances the processing to S1903.

In S1903, the delivery server 133 delivers the setting item package 1101. Then, the processing in the flowchart ends.

Next, with reference to FIG. 18B, processing for delivering a firmware program to be performed by the delivery server 133 will be described.

In S1904, the delivery server 133 receives a delivery instruction from the set-value management server 136. The processing then moves to S1905.

In S1905, the delivery server 133 checks the status of the delivery permission flag of a network device corresponding to the delivery instruction received in S1904 above (hereinafter, the target network device).

Next, in S1906, the delivery server 133 determines whether there is a target network device with the delivery permission flag being OFF or not with reference to the delivery permission flag table 1501. If it is determined that there is not target network device with the delivery permission flag being OFF (No in S1906), the delivery server 133 moves the processing to S1909.

On the other hand, if it is determined that there is a target network device with the delivery permission flag being OFF (Yes in S1906), the delivery server 133 moves the processing to S1907.

In S1907, the delivery server 133 instructs the set-value management server 136 to change the status of the delivery permission flag delivery permission flag being OFF of the target network device to ON (delivery permission flag change instruction).

In S1908, the delivery server 133 waits until a notification of completion of the change of the status of the delivery permission flag is received from the set-value management server 136. Then, if the delivery server 133 determines that the notification of the completion of the change of the status of the delivery permission flag from the set-value management server 136 (Yes in S1908), the processing moves to S1909.

In S1909, the delivery server 133 defines settings in the delivery information regarding the target network device. As described above, the firmware program version and the delivery date and time to be applied may be defined arbitrarily in accordance with the use case.

Next, in S1910, the delivery server 133 transmits the delivery information defined in S1909 to the monitoring center host 111.

Next, in S1911, the delivery server 133 waits until a delivery request is received from a network device. If the delivery server 133 determines that a delivery request has been received from a network device (Yes in S1911), the processing moves to S1912.

In S1912, the delivery server 133 delivers the firmware program to the network device.

Next, in S1913, the delivery server 133 waits until a notification of completion of update is received from the network device. If the delivery server 133 determines that a notification of completion of the update has been received from the network device (Yes in S1913), the processing moves to S1914.

In S1914, the delivery server 133 waits until a notification of completion of the change of the status of the delivery permission flag is received from the set-value management server 136. If the delivery server 133 determines that the notification of completion of the change of the status of the delivery permission flag has been received from the set-value management server 136 (Yes in S1914), the processing in the flowchart ends.

In the configuration example according to the aforementioned exemplary embodiment, the set-value management server 136 is provided in the server apparatus separately from a network device. However, the set-value management server 136 may be built in a network device. In this case, functions of the set-value management server 136 may be implemented by programs stored in the ROM 307 or HDD 309 and invoked and executed by the CPU 306 in the network device.

Having described that according to the aforementioned exemplary embodiment, a firmware program is delivered from a delivery server to a network device, a software program to be delivered from a delivery server is not limited to a firmware program but may be any software program if it is a software program.

Having described that according to the aforementioned exemplary embodiment, an image formation apparatus such as a multi-function peripheral, a copy machine, or a printer is provided as an example of the network device, the network device to which the present invention is applicable is not limited to such an image formation apparatus but may be any type of apparatus if it is a network device capable of receiving delivery of a software program. For example, the network device may be a personal computer, a networked home appliance such as a television, a car navigation system, a digital medical device, a network camera, robot or the like.

As described above, with the collaboration of the set-value management server 136 and the delivery server 133, a firmware program in a network device can be updated if the set-value management server 136 determines that the update of the firmware program in the network device is necessary. Even when the delivery permission flag of the network device is OFF, remote delivery of a firmware program can be performed by the delivery server 133.

Therefore, when many network devices are targets of delivery of a software program such as a firmware program, the labor and costs of a serviceman can be saved, and the time up to the firmware program delivery can be reduced. Thus, quick application of the software program such as a firmware program can be achieved.

It should be noted that the configurations and details of various data as described above are not limited to those described above, and various configurations and details are possible in accordance with the usage and purpose.

Having described one exemplary embodiment above, the present invention can be embodied as a system, an apparatus, a method, a program, a storage medium or the like, for example. More specifically, the present invention may be applied to a system including a plurality of apparatuses or may be applied to an apparatus including one device.

All of configurations acquired by combining the aforementioned exemplary embodiments are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-000621, filed Jan. 6, 2015, which is hereby incorporated by reference herein in its entirety.

What is claimed is:

1. A network system comprising a delivery system controlling delivery of a software program to a network device and a setting management system managing set values for the network device,
  wherein the delivery system includes a first memory storing instructions, and a first processor which is capable of executing the instructions stored in the first memory causing the delivery system to:
    perform a determination process for determining whether a flag for permitting a software program delivery from the delivery system within the network device being a delivery target of a software program is activated or not; and
    instruct the setting management system via a network to activate the flag of the delivery target network device when it is determined that the flag is not activated,
  wherein the setting management system includes a second memory storing instructions, and a second processor which is capable of executing the instructions stored in the second memory causing the setting management system to:
    transmit, to the network device, a first change instruction for activating the flag of the network device in response to the instruction from the delivery system; and
    send, to the delivery system via the network, a notification of completion of the activation of the flag of the network device,
  wherein the instructions stored in the first memory further cause the delivery system to prepare a delivery of the software program in response to the notification received from the setting management system, and control the delivery of the software program in response to a request from the network device with the activated flag after the preparation for the delivery, and
  wherein the instructions stored in the second memory further cause the setting management system to transmit, to the network device, a second change instruction for inactivating the flag having been activated according to the first change instruction after the delivery of the software program performed by the delivery system.

2. The network system according to claim 1, wherein the instructions stored in the first memory further cause the delivery system to provide the setting management system with information associated with a setting item newly managed by the network device in accordance with application of the software program.

3. The network system according to claim 2, wherein the instructions stored in the second memory further cause the setting management system to set a set value corresponding to the provided setting item for the network device.

4. The network system according to claim 2, wherein the instructions stored in the second memory further cause the setting management system to determine whether a delivery of the software program to the network device is necessary or not based on the provided setting item.

5. The network system according to claim 1, wherein the instructions stored in the first memory further cause the delivery system to receive an instruction to deliver the software program from the setting management system, and
  wherein the determination process by the delivery system is performed in response to the received instruction to deliver.

6. The network system according to claim 1, wherein the delivery preparation includes registering information regarding the network device being a delivery target of the software program with a management system centrally managing network devices.

7. The network system according to claim 1, wherein the instructions stored in the first memory further cause the delivery system to hold a status of a flag of each of network devices to be used in the determination process by the delivery system.

8. The network system according to claim 1, wherein the setting management system is built in a server apparatus or a network device.

9. A control method for a network system comprising a delivery system controlling delivery of a software program to a network device and a setting management system managing set values for the network device, the method comprising:
  performing, by the delivery system, a determination process for determining whether a flag for permitting a software program delivery from the delivery system within the network device being a delivery target of a software program is activated or not;
  instructing, by the delivery system, the setting management system via a network to activate the flag of the delivery target network device when it is determined that the flag is not activated;
  transmitting, from the setting management system to the network device, a first change instruction for activating the flag of the network device in response to the instruction from the delivery system;
  sending, from the setting management system to the delivery system via the network, a notification of completion of the activation of the flag of the network device;
  preparing, by the delivery system, a delivery of the software program in response to the notification received from the setting management system;
  controlling, by the delivery system, the delivery of the software program in response to a request from the network device with the activated flag after the preparation for the delivery; and
  transmitting, from the setting management system to the network device, a second change instruction for inactivating the flag having been activated according to the first change instruction after the delivery of the software program performed by the delivery system.

* * * * *